(12) United States Patent
Jeon et al.

(10) Patent No.: US 12,315,910 B2
(45) Date of Patent: May 27, 2025

(54) DEVICE FOR PRE-LITHIATION OF NEGATIVE ELECTRODE AND METHOD FOR PRE-LITHIATION OF NEGATIVE ELECTRODE

(71) Applicant: LG ENERGY SOLUTION, LTD., Seoul (KR)

(72) Inventors: Seo Young Jeon, Daejeon (KR); Ye Ri Kim, Daejeon (KR); Oh Byong Chae, Daejeon (KR); Seung Hae Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 571 days.

(21) Appl. No.: 17/761,660

(22) PCT Filed: Aug. 13, 2021

(86) PCT No.: PCT/KR2021/010788
§ 371 (c)(1),
(2) Date: Mar. 18, 2022

(87) PCT Pub. No.: WO2022/039449
PCT Pub. Date: Feb. 24, 2022

(65) Prior Publication Data
US 2022/0328805 A1    Oct. 13, 2022

(30) Foreign Application Priority Data
Aug. 21, 2020 (KR) .................. 10-2020-0105346

(51) Int. Cl.
*C25D 9/04* (2006.01)
*H01M 4/04* (2006.01)
(Continued)

(52) U.S. Cl.
CPC .............. *H01M 4/134* (2013.01); *C25D 9/04* (2013.01); *H01M 4/0416* (2013.01);
(Continued)

(58) Field of Classification Search
None
See application file for complete search history.

(56) References Cited

U.S. PATENT DOCUMENTS 4,551,210 A * 11/1985 Parthasarathi ......... H05K 3/384
204/207
5,743,921 A    4/1998 Nazri et al.
(Continued)

FOREIGN PATENT DOCUMENTS

CN    101421440 A    4/2009
CN    104081573 A    10/2014
(Continued)

OTHER PUBLICATIONS

Abe et al., "Effect of Prelithiation Process for Hard Carbon Negative Electrode on the Rate of Cycling Behaviors of Lithium-Ion Batteries," Batteries, vol. 4, No. 71, Dec. 12, 2018, pp. 1-16.
(Continued)

*Primary Examiner* — Stefanie S Wittenberg
(74) *Attorney, Agent, or Firm* — Birch, Stewart, Kolasch & Birch, LLP (57) ABSTRACT

A device for pre-lithiation including a pre-lithiation reactor sequentially divided into an impregnation section, a pre-lithiation section, and an aging section. The pre-lithiation reactor accommodates a pre-lithiation solution through which a negative electrode structure is moved. A negative electrode roll is arranged outside the pre-lithiation solution, and the pre-movement negative electrode structure is wound. A lithium metal counter electrode is arranged in the pre-lithiation solution of the pre-lithiation section, and is (Continued)

arranged to be spaced apart from the negative electrode structure to face the negative electrode structure moving in the pre-lithiation solution. A charging and discharging unit is connected to the negative electrode structure and connected to the lithium metal counter electrode. The lithium metal counter electrode is tilted and a separation distance between the lithium metal counter electrode and the negative electrode structure gradually increases in the moving direction of the negative electrode structure.

16 Claims, 7 Drawing Sheets

(51) Int. Cl.
    *H01M 4/134*     (2010.01)
    *H01M 4/1395*     (2010.01)
    *H01M 10/0525*     (2010.01)
    *H01M 4/02*     (2006.01)

(52) U.S. Cl.
    CPC ....... *H01M 4/0435* (2013.01); *H01M 4/0445* (2013.01); *H01M 4/1395* (2013.01); *H01M 10/0525* (2013.01); *H01M 2004/027* (2013.01)

(56) References Cited

U.S. PATENT DOCUMENTS

| | | | |
|---|---|---|---|
| 9,598,789 B2 | 3/2017 | Grant et al. | |
| 2005/0042868 A1 | 2/2005 | Matsuo et al. | |
| 2007/0278105 A1* | 12/2007 | Ettel | C25D 17/008 204/280 |
| 2019/0088922 A1 | 3/2019 | Zhamu et al. | |
| 2021/0010148 A1* | 1/2021 | Nishikiuchi | C25D 17/06 |
| 2021/0066703 A1 | 3/2021 | Kim et al. | |
| 2021/0384485 A1 | 12/2021 | Chae et al. | |

FOREIGN PATENT DOCUMENTS

| | | | | |
|---|---|---|---|---|
| CN | 105470465 A | 4/2016 | | |
| CN | 110268557 A | 9/2019 | | |
| CN | 210224168 U | 3/2020 | | |
| CN | 111278669 A | 6/2020 | | |
| JP | 9-22690 A | 1/1997 | | |
| JP | 3196941 B2 | 8/2001 | | |
| JP | 2003-82500 A | 3/2003 | | |
| JP | 2004-137545 A | 5/2004 | | |
| JP | 2008-16199 A | 1/2008 | | |
| JP | 5003088 B2 | 8/2012 | | |
| JP | 2015-507316 A | 3/2015 | | |
| JP | 6613647 B2 | 12/2019 | | |
| KR | 20130028848 | * | 3/2013 | ............ C25D 3/38 |
| KR | 10-2014-0106645 A | 9/2014 | | |
| KR | 10-2020-0046944 A | 5/2020 | | |
| KR | 10-2020-0053300 A | 5/2020 | | |
| KR | 10-2020-0095039 A | 8/2020 | | |
| TW | 201603371 A | 1/2016 | | |
| WO | WO 2007/121549 A1 | 11/2007 | | |
| WO | WO 2015/060443 A1 | 4/2015 | | |

OTHER PUBLICATIONS

International Search Report (PCT/ISA/210) issued in PCT/KR2021/010788 mailed on Dec. 3, 2021.

* cited by examiner

DEVICE FOR PRE-LITHIATION OF NEGATIVE ELECTRODE AND METHOD FOR PRE-LITHIATION OF NEGATIVE ELECTRODE

TECHNICAL FIELD

This application claims the benefit of priority based on Korean Patent Application No. 10-2020-0105346, filed on Aug. 21, 2020, and the entire contents of the Korean patent application are incorporated herein by reference.

The present invention relates to an apparatus and method for pre-lithiating a negative electrode.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

The positive electrode and the negative electrode are formed by applying a positive electrode slurry containing a positive electrode active material and a negative electrode slurry containing a negative electrode active material to a positive electrode current collector and a negative electrode current collector, to thereby form a positive electrode active material layer and a negative electrode active material layer, respectively, followed by drying and rolling them.

In the case of such a negative electrode, a passive film such as a solid electrolyte interface (SEI) layer is formed on the surface of the negative electrode during the initial charge. The passive film interrupts injection of the organic solvent into the negative electrode and suppresses decomposition reaction of the organic solvent, thereby stabilizing the structure of the negative electrode, improving the reversibility of the negative electrode, and allowing the negative electrode to be usable. However, since the formation reaction of the passive film is an irreversible reaction, the consumption of the lithium ions is caused, thereby decreasing the capacity of the battery, and as the battery cycle is repeated, the lithium ions are consumed, thereby causing capacity reduction and cycle lifespan reduction.

As such, a method for forming a passive film on the surface of a negative electrode, preventing the capacity reduction and improving cycle lifespan by pre-lithiating the negative electrode through inserting lithium into the negative electrode is currently developed.

Such a pre-lithiation method includes a physical method of allowing lithium metal to directly contact the surface of the negative electrode, and a method of connecting lithium metal with the negative electrode and electrochemically charging the negative electrode. In the case of the electrochemically charging method, charging is performed in a state that lithium metal is set to be spaced apart from a negative electrode by a predetermined distance. In this case, a uniform SEI film was not formed on the negative electrode due to the movement of the lithium metal and the negative electrode in the electrolyte solution. In this case, the initial efficiency and cycle characteristics of the negative electrode decrease.

Hence, there is a need for a technology for enhancing the initial efficiency and cycle characteristics of a negative electrode by uniformly pre-lithiating the negative electrode.

DISCLOSURE

Technical Problem

An object of the present invention is to provide a negative electrode pre-lithiation apparatus and method for enhancing initial efficiency of the negative electrode and preventing degeneration of a battery by uniformly pre-lithiating the negative electrode in pre-lithiating a negative electrode in an electrochemical charging scheme.

Technical Solution

An apparatus for pre-lithiating a negative electrode according to the present invention includes: a pre-lithiation reactor which is sequentially divided into an impregnation section, a pre-lithiation section and an aging section, wherein the pre-lithiation reactor accommodates a pre-lithiation solution in which a negative electrode structure is moved through the pre-lithiation reactor; a negative electrode roll which is arranged outside the pre-lithiation solution and on which the negative electrode structure before being moved through the pre-lithiation reactor is wound; a lithium metal counter electrode present in the pre-lithiation solution in the pre-lithiation section and the lithium metal counter electrode is spaced apart from the negative electrode structure by a predetermined distance to face the negative electrode structure which is moved in the pre-lithiation solution; and a charge and discharge unit which is connected to the negative electrode structure and connected to the lithium metal counter electrode, wherein the lithium metal counter electrode is tilted such that a separation distance from the negative electrode structure gradually increases in a moving direction of the negative electrode structure.

In a specific example, the lithium metal counter electrode is arranged only in the pre-lithiation section.

At this time, a separation distance between the lithium metal counter electrode and the negative electrode structure at an ending point of the pre-lithiation section corresponds to 1.2 to 5 times of a separation distance between the lithium metal counter electrode and the negative electrode structure at a starting point of the pre-lithiation section.

Further, the separation distance between the lithium metal counter electrode and the negative electrode structure at the starting point of the pre-lithiation section is in a range of 1 mm to 20 mm.

Further, the negative electrode structure includes a negative electrode current collector and a negative electrode active material layer on at least one surface of a negative electrode current collector, and a non-coated part on at least one side of the negative electrode current collector in a width direction of the negative electrode active material layer.

At this time, the lithium metal counter electrode may face only the negative electrode active material layer.

Further, the apparatus for pre-lithiating a negative electrode according to the present invention further includes a washing tank containing an organic solvent.

Further, the apparatus further includes a dryer connected to the washing tank, wherein the dryer dries the negative electrode structure having passed through the washing tank, and a collection roll for winding and unwinding the negative electrode structure transferred to the drying unit.

Further, the present invention provides a method for pre-lithiating a negative electrode.

The method for pre-lithiating a negative electrode according to the present invention includes: preparing a negative electrode structure and the above-described apparatus for pre-lithiating a negative electrode; impregnating the negative electrode structure with a pre-lithiation solution while moving the negative electrode structure through the impregnation section in the pre-lithiation reactor to form an impregnated negative electrode structure; pre-lithiating the impregnated negative electrode structure while moving the negative electrode structure through the pre-lithiation solution of the pre-lithiation section to form a pre-lithiated negative electrode structure; and aging the pre-lithiated negative electrode structure in the aging section, wherein the pre-lithiating is performed by arranging a lithium metal counter electrode spaced apart from the negative electrode structure, in a pre-lithiation section, and electrochemically charging the negative electrode structure, and wherein the lithium metal counter electrode is tilted such that a separation distance from the negative electrode structure gradually increases in a moving direction of the negative electrode structure.

Herein, a separation distance between the lithium metal counter electrode and the negative electrode structure at an ending point of the pre-lithiation section corresponds to 1.2 to 5 times of a separation distance between the lithium metal counter electrode and the negative electrode structure at a starting point of the pre-lithiation section.

Herein, the separation distance between the lithium metal counter electrode and the negative electrode structure at the starting point of the pre-lithiation section is in a range of 1 mm to 20 mm.

Further, the negative electrode structure includes a negative electrode current collector and a negative electrode active material layer on at least one surface of a negative electrode current collector, and a non-coated part on at least one side of the negative electrode current collector in a width direction of the negative electrode active material layer.

At this time, the lithium metal counter electrode may be arranged to only the negative electrode active material layer.

Further, the method for pre-lithiating a negative electrode according to the present invention further includes taking the negative electrode structure from the pre-lithiation reactor and washing the negative electrode structure.

Further, the method further includes drying the washed negative electrode structure.

Further, the present invention provides a method for manufacturing a secondary battery including the above-described method of pre-lithiating a negative electrode.

Advantageous Effects

According to a method of pre-lithiating a negative electrode of the present invention, as the lithium metal counter electrode is tilted such that a separation distance with the negative electrode structure gradually increases in a moving direction of the negative electrode structure, it is possible to uniformly pre-lithiate the negative electrode structure by fine current in the vicinity of the end in the moving direction of the lithium metal counter electrode, thereby improving initial efficiency and cycle characteristics of a battery.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

Figure 1:
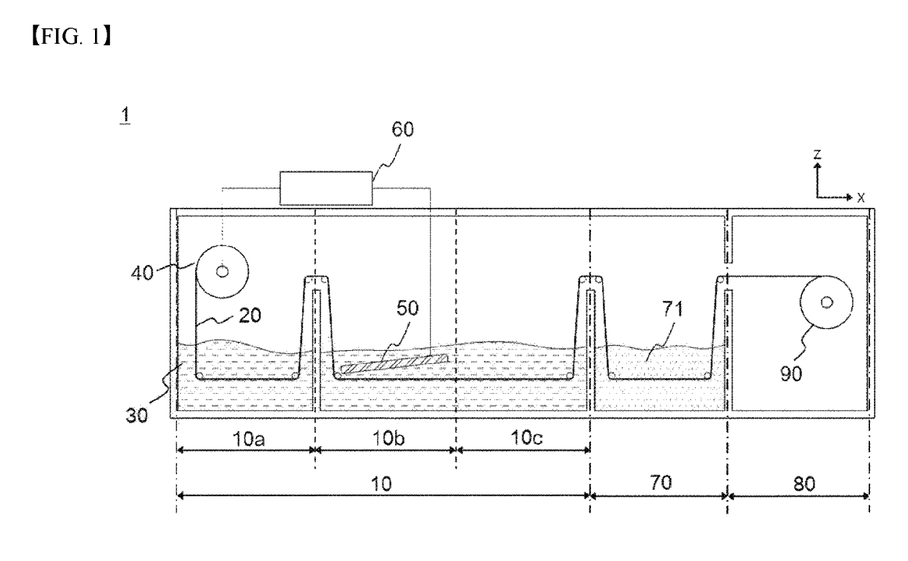
FIG. 1 is a schematic diagram showing the structure of an apparatus for pre-lithiating a negative electrode according to the present invention.
Figure 2:
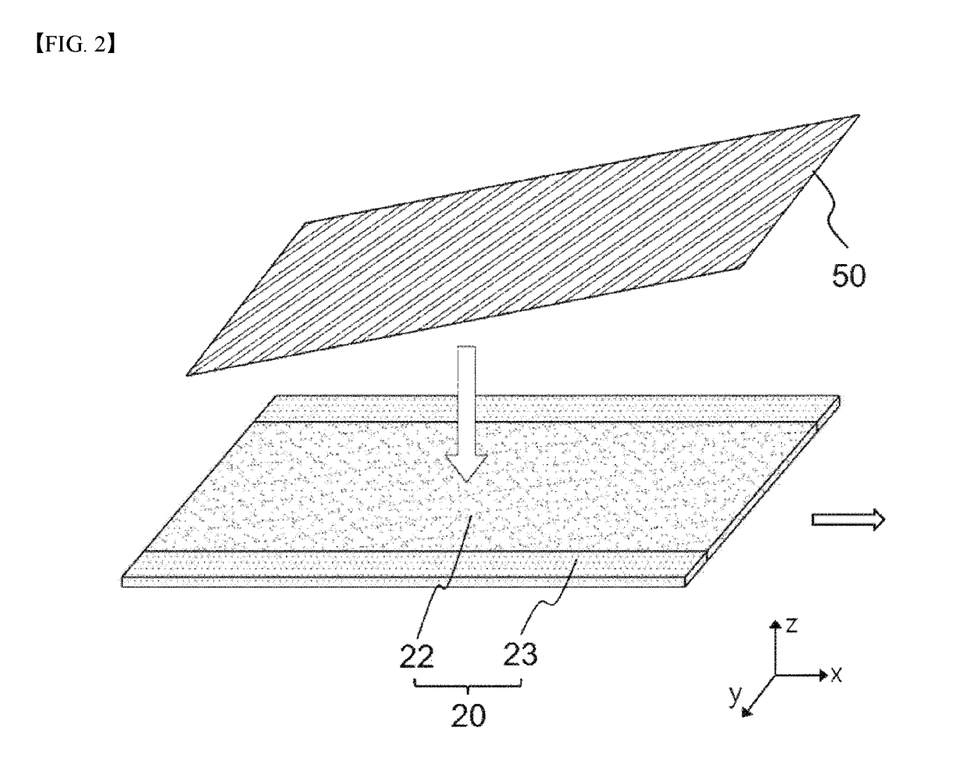
FIGS. 2 to 4 are schematic diagrams illustrating an array relationship between a negative electrode structure and a lithium metal counter electrode in an apparatus for pre-lithiating a negative electrode according to the present invention.
Figure 3:
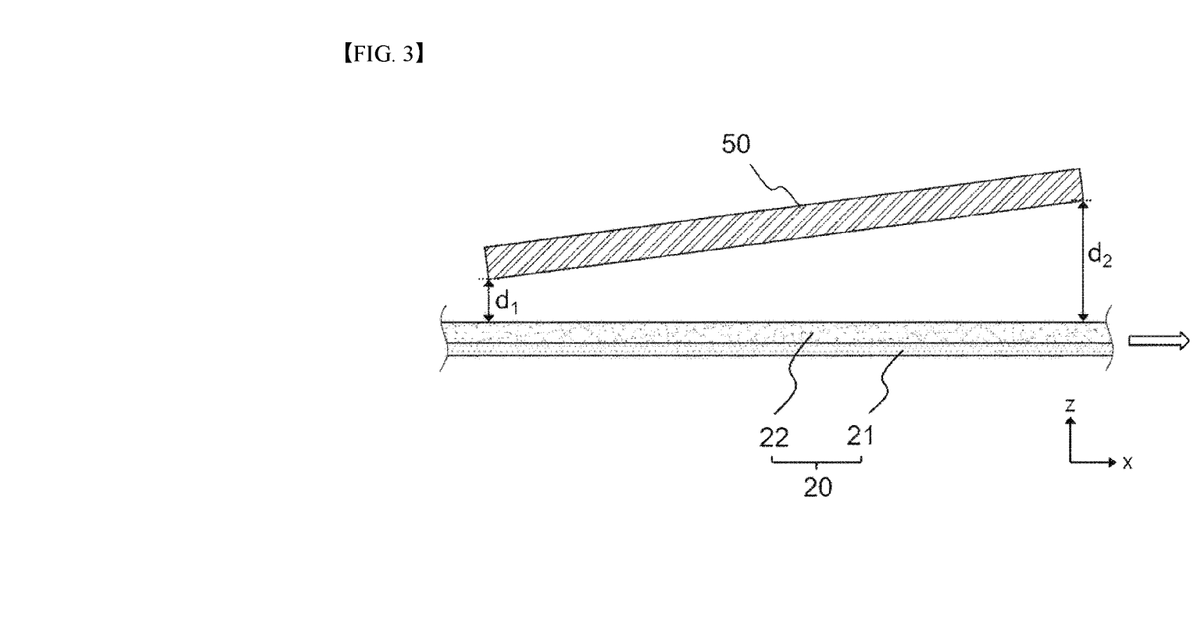
Figure 4:
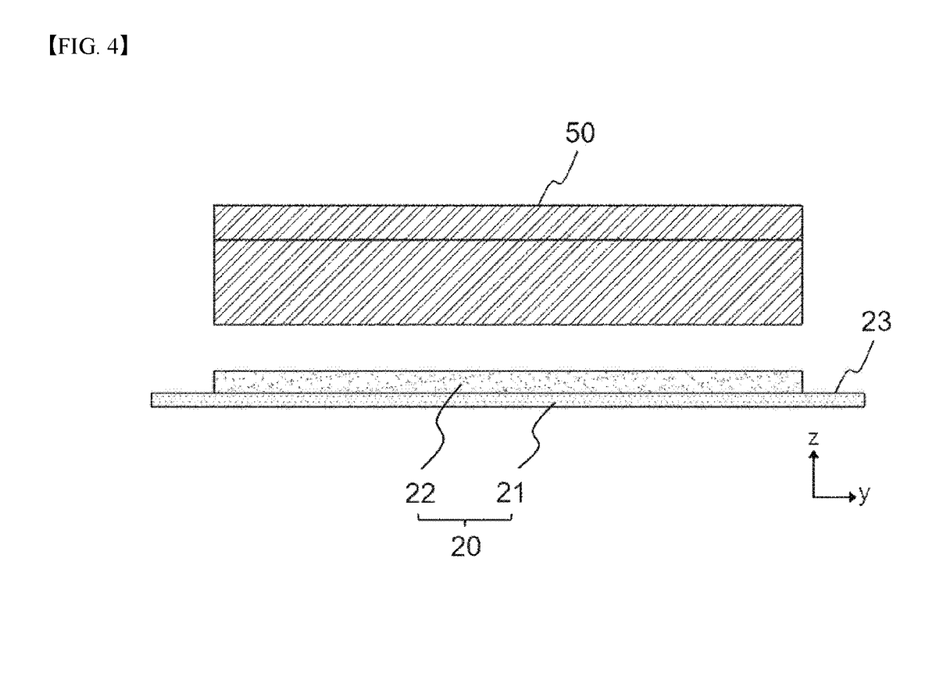

FIG. 1 is a schematic diagram showing the structure of an apparatus for pre-lithiating a negative electrode according to the present invention. FIGS. 2 to 4 are schematic diagrams illustrating an array relationship between a negative electrode structure and a lithium metal counter electrode in an apparatus for pre-lithiating a negative electrode according to the present invention.

Referring to FIG. 1, the apparatus 1 for pre-lithiating a negative electrode according to the present invention includes: a pre-lithiation reactor 10 which is sequentially divided into an impregnation section 10a, a pre-lithiation section 10b and an aging section 10c, and accommodates a pre-lithiation solution 30 in which a negative electrode structure 20 is moved; a negative electrode roll 40 which is arranged outside the pre-lithiation solution 30 and on which the negative electrode structure 20 before being moved is wound; a lithium metal counter electrode 50 which is arranged in the pre-lithiation solution 30 in the pre-lithiation section 10b and is spaced apart from the negative electrode structure 20 by a predetermined distance to face the negative electrode structure 20 which is moved in the pre-lithiation solution 30; and a charge and discharge unit 60 which is connected to the negative electrode structure 20 and the lithium metal counter electrode 50, in which the lithium metal counter electrode 50 is tilted such that a separation distance with the negative electrode structure 20 gradually increases in a moving direction of the negative electrode structure 20.

Further, in the present invention, the direction, in which the negative electrode structure is moved in each section, is defined as the moving direction, which is indicated as the x-axis direction. Further, the width direction of the negative electrode structure is a direction perpendicular to the moving direction and is indicated as the y-axis direction.

As described above, in the case of a pre-lithiation method using a electrochemical charging scheme, charging is performed in a state that lithium metal is set to be spaced apart from a negative electrode by a predetermined distance. In this case, a uniform SEI film was not formed on the negative electrode due to the movement of the lithium metal and the negative electrode in the electrolyte solution. In this case, the initial efficiency and cycle characteristics of the negative electrode decrease.

As such, according to the present invention, as the lithium metal counter electrode is tilted such that a separation distance with the negative electrode structure gradually increases in a moving direction of the negative electrode structure in the process of electrochemically charging a negative electrode, it is possible to uniformly pre-lithiate the negative electrode structure by fine current in the vicinity of the end in the moving direction of the lithium metal counter electrode, thereby improving initial efficiency and cycle characteristics of a battery.

Hereinafter, the configuration of an apparatus for pre-lithiating a negative electrode according to the present invention will be described in detail.

Referring to FIG. 1, an apparatus 1 for manufacturing a negative electrode of the present invention may be an apparatus for manufacturing a negative electrode by pre-lithiating a negative electrode structure, for example, pre-lithiating a negative electrode by using an electrochemical charging scheme, and may be an apparatus for manufacturing a negative electrode using a roll-to-roll process.

Specifically, the pre-lithiation reactor 10 is a place where a pre-lithiation solution 30 is accommodated, and impregnation, pre-lithiation reaction, and aging of the negative electrode structure are performed. The pre-lithiation reactor 10 is sequentially divided into an impregnation section 10a, a pre-lithiation section 10b, and an aging section 10c. As such, the negative electrode structure 20, which is unwound from the negative electrode roll 40, is inserted into the pre-lithiation solution 30 to thereby be moved in each section of the pre-lithiation reactor 10.

At this time, sections were not divided in the pre-lithiation reactor 10 in a closed manner and were abstractly divided according to the position of the negative electrode structure 20 in the pre-lithiation reactor 10 and according to the process which was performed according to the position of the negative electrode structure 20 in the pre-lithiation reactor 10. Specifically, the impregnation section 10a, the pre-lithiation section 10b, and the aging section 10c were not physically divided and were abstractly divided according to the process in which the negative electrode structure 20 was performed in the corresponding section. As the negative electrode structure 20 is moved in the pre-lithiation reactor 10, the negative electrode structure 20 is pre-lithiated while passing through each section. The movement of the negative electrode structure may be performed by a transfer roll in the pre-lithiation solution.

Further, the pre-lithiation solution 30 may contain a lithium salt and an organic solvent.

Specifically, the lithium salt may contain at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloro boran lithium, low aliphatic carboxylic acid lithium, and 4 phenyl boric acid lithium.

Any organic solvent, which is commonly used in the related art, may be used as the organic solvent, but a high boiling point organic solvent may be preferably used to minimize the consumption of the electrolyte solution for pre-lithiation by evaporation during pre-lithiation.

For example, the organic solvent may contain at least one selected from the group consisting of a carbonate solvent and an ester-based solvent. The non-aqueous solvent may contain at least one selected from the group consisting of propylene carbonate (PC), ethylene carbonate (EC), diethyl carbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethyl methylcarbonate (EMC), gamma butyrolactone (g-boutilactone), ethyl propionate, methyl propionate, but the present invention is not limited thereto.

Further, the pre-lithiation solution may further contain an additive, and the additive may include at least one selected from the group consisting of vinylene carbonate, vinylethylene carbonate, fluoroethylene carbonate, salicylic acid, LiBF$_4$, LITFSI (Lithium bis(trifluoromethanesulfonyl)imide), LiBOB (Lithium bis(oxalato)borate), and LiODFB (Lithium difluoro(oxalato)borate).

Further, the temperature of the pre-lithiation solution may be 10 to 80° C., specifically 20 to 60° C., and more specifically 25 to 40° C. When pre-lithiation is performed in the above temperature range, lithium can be smoothly diffused.

As the pre-lithiation solution 30 is accommodated in the pre-lithiation reactor 10, the pre-lithiation solution 30 is included in all of the impregnation section 10a, the pre-lithiation section 10b, and the aging section 10c.

The size, shape, etc. of the pre-lithiation reactor 10 may be appropriately designed in consideration of the impregnation, pre-lithiation, and aging degree of the negative electrode structure, and the moving distance of the negative electrode structure according to the roll-to-roll process, etc.

Further, the size or length of the impregnation section 10a, the pre-lithiation section 10b, and the aging section 10c may be appropriately designed in consideration of the electrolyte solution impregnation, pre-lithiation and aging degree of the negative electrode structure 20. Specifically, the ratio of the lengths of the impregnation section 10a, the pre-lithiation section 10b, and the aging section 10c may be 1 to 10:1:0.5 to 21, and preferably 1.5 to 5:1:1.8 to 10 for smooth pre-lithiation.

Further, the apparatus 1 for pre-lithiating a negative electrode according to the present invention includes a negative electrode roll 40 on which the negative electrode structure 20 is wound. The negative electrode structure 20 may be wound on the negative electrode roll 40 and then unwound from the negative electrode roll to thereby be inserted into the pre-lithiation solution 30 in the pre-lithiation reactor 10. Any roll, which is commonly used in a roll-to-roll process, may be used as the negative electrode roll 40.

The diameter, width, etc. of the negative electrode roll 40 may be appropriately designed in consideration of the thickness, amount, etc. of the wound negative electrode structure. For example, the diameter of the negative electrode roll 40 may be in the range of 3 to 50 cm, and specifically in the range of 5 to 12 cm. The width of the negative electrode roll 40 may be in the range of 5 to 40 cm, and specifically in the range of 10 to 20 cm.

The negative electrode structure 20 has a structure that a negative electrode active material layer 22 is formed on at least one surface of a negative electrode current collector 21, and a non-coated part 23 is formed on at least one side in a width direction of the negative electrode active material layer 22. At this time, a negative electrode slurry containing a negative electrode active material is applied and is then dried and rolled to thereby form a negative electrode active material layer 22. The negative electrode slurry may further include conductive materials and binders.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

The negative electrode active material may contain at least one selected from the group consisting of a carbon-based active material and a silicon-based active material.

The silicon-based active material may impart excellent capacity characteristics to the negative electrode or secondary battery of the present invention and may contain a compound represented by $SiO_x$ ($0 \leq x < 2$). Since Sift does not react with lithium ions, lithium cannot be stored, and thus x is preferably in the above range. More preferably, the silicon-based oxide may be SiO. The average particle diameter ($D_{50}$) of the silicon-based oxide may be 1 to 30 μm, and preferably 3 to 15 μm in terms of reducing side reaction with the electrolyte solution while maintaining structural stability during charge/discharge. The average particle diameter $D_{50}$ may be measured using, for example, a laser diffraction method.

The carbon-based active material may impart excellent cycle characteristics or battery lifespan performance to a secondary battery or a negative electrode for a secondary battery of the present invention. Specifically, the carbon-based active material may contain at least one selected from the group consisting of artificial graphite, natural graphite, hard carbon, soft carbon, carbon black, acetylene black, Ketjen black, super P, graphene and textile carbon, and preferably at least one selected from the group consisting of artificial graphite and natural graphite. The average particle diameter ($D_{50}$) of the carbon-based oxide may be 10 to 30 μm, and preferably 15 to 25 μm in terms of reducing side reaction with the electrolyte solution while maintaining structural stability during charge/discharge.

Specifically, both the silicon-based active material and the carbon-based active material may be used as the negative electrode active material in terms of improving both the capacity characteristics and cycle characteristics. Specifically, the negative electrode active material may include the carbon-based active material and the silicon-based active material in the weight ratio of 50:50 to 95:5, and preferably in the weight ratio of 60:40 to 80:20.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The negative electrode structure 20 can be pre-lithiated by being charged and discharged by a charge and discharge unit 60 after being connected to a lithium metal counter electrode 50 to be described later.

Further, in the present invention, the lithium metal counter electrode 50 may be disposed in the pre-lithiation solution 30 and be disposed to be spaced apart from the negative electrode structure 20 by a predetermined distance to face the negative electrode structure 20, to thereby function as a counter electrode to the negative electrode structure during electrochemical charge for pre-lithiation. Specifically, when the lithium metal counter electrode 50 is pre-lithiated by electrochemical charging, the lithium metal counter electrode 50 may function as a lithium source which supplies lithium ions into the negative electrode structure 20. The lithium metal counter electrode 50 may have a sheet form disposed to face the negative electrode structure 20.

The thickness of the lithium metal counter electrode 50 may be appropriately set in consideration of the pre-lithiation level, and may specifically be 10 to 500 μm, and more specifically be 40 to 200 μm.

The lithium metal counter electrode 50 can prevent a short circuit phenomenon which may occur by a direct contact between the negative electrode structure 20 and the lithium metal counter electrode 50 during electrochemical charge by being spaced apart from the negative electrode structure 20.

The lithium metal counter electrode 50 is tilted such that a separation distance with the negative electrode structure 20 gradually increases in a moving direction of the negative electrode structure 20. Likewise, uniform pre-lithiation of the negative electrode structure 20 is possible by allowing the lithium metal counter electrode 50 to be tilted in a specific direction.

Referring to FIGS. 2 to 4 together with FIG. 1, lithium may be allowed to enter into the inner side of the negative electrode structure 20 at the initial part of the pre-lithiation section 10b by allowing the lithium metal counter electrode 50 and the negative electrode structure 20 to be disposed to be close to each other at the starting point of the pre-lithiation section 10b. Thereafter, fine current, which is applied to the negative electrode structure 20, may be formed by increasing the separation distance between the lithium metal counter electrode 50 and the negative electrode structure 20 at the ending point of the pre-lithiation section 10b, and a uniform and stable SEI film may be formed on the surface of the negative electrode structure 20 by such fine current, thereby maintaining a stable state after pre-lithiation. Further, when the negative electrode structure is moved in the pre-lithiation section 10b, the negative electrode structure 20 may be shaken to some degree. In this case, the negative electrode active material layer 22 of a portion, which does not sufficiently face the lithium metal counter electrode 50 in the negative electrode structure 20, may not be sufficiently pre-lithiated. In this case, the fine current can alleviate the degree of non-uniformity of the pre-lithiation according to the width direction. As a result, the initial efficiency and cycle characteristics of the battery can be improved.

On the other hand, when the distance between the lithium metal counter electrode and the negative electrode structure at the starting point of the pre-lithiation section is the same as the distance between the lithium metal counter electrode and the negative electrode structure at the ending point of the pre-lithiation section, such fine current does not occur, and thus it is difficult to uniformly charge the negative electrode structure.

Further, in the case that the lithium metal counter electrode is tilted such that a separation distance with the negative electrode structure gradually increases in a moving direction of the negative electrode structure, a SEI film is formed on the surface as fine current is applied at the starting point of the pre-lithiation section. Thereafter, even when the lithium metal counter electrode gets close to the negative electrode structure, lithium ions fails to flow in and side reaction occurs on the surface.

The separation distance ($d_2$) between the lithium metal counter electrode 50 and the negative electrode structure 20 at the ending point of the pre-lithiation section 10b may correspond to 1.2 to 5 times, specifically 1.2 to 3 times and more specifically 2 to 3 times of the separation distance ($d_1$) between the lithium metal counter electrode 50 and the negative electrode structure 20 at the starting point of the pre-lithiation section 10b. When the difference between the separation distance between the lithium metal counter electrode 50 and the negative electrode structure 20 at the starting point of the pre-lithiation section 10b and the separation distance between the lithium metal counter electrode 50 and the negative electrode 20 at the ending point of the pre-lithiation section 10b is within the above range, a stable SEI film may be formed as fine current is sufficiently formed in the negative electrode structure 20.

Herein, the separation distance ($d_1$) between the lithium metal counter electrode 50 and the negative electrode structure 20 at the starting point of the pre-lithiation section 10b may be in a range of 1 to 20 mm. Specifically, the separation distance ($d_1$) between the lithium metal counter electrode 50 and the negative electrode structure 20 at the starting point of the pre-lithiation section 10b may be in the range of 3 to 15 mm, and more specifically in the range of 6 to 12 mm. When the separation distance ($d_1$) between the lithium metal counter electrode 50 and the negative electrode 20 is in the above range, it is possible to sufficiently prevent an electrode short circuit phenomenon which may occur by a direct contact between the negative electrode structure 20 and the lithium metal counter electrode 50, and lithium can be smoothly inserted into the negative electrode structure 20 at the time of pre-lithiation.

Further, referring to FIG. 4, the lithium metal counter electrode 50 is arranged to fact only the negative electrode active material layer 22. Namely, the lithium metal counter electrode 50 is arranged not to face the non-coated part 23 formed on two sides of the negative electrode active material layer 22. This is to prevent lithium metal from being precipitated on the non-coated part 23 as the lithium metal counter electrode 50 faces the non-coated part 23.

To this end, the length in the width direction (y-axis direction) of the lithium metal counter electrode 50 may be the same as the length in the width direction of the negative electrode active material layer 22. Alternatively, the length in the width direction of the lithium metal counter electrode may be set to be smaller than the length in the width direction of the negative electrode active material layer by reflecting the degree to which the negative electrode structure is shaken during movement.

Further, referring to FIGS. 1 to 4, the negative electrode active material layer 22 is formed on only one surface of the negative electrode current collector 21, and the lithium metal counter electrode 50 is disposed to face only one surface where the negative electrode active material layer 22 is formed. In the case that the negative electrode active material layer is formed on two surfaces of the negative electrode current collector, two lithium metal counter electrodes may be disposed to face the negative electrode active material layer on two surfaces.

Further, referring to FIG. 1, an apparatus 1 for pre-lithiating a negative electrode according to the present invention further includes a washing tank 70 including an organic solvent 71. The washing tank 70 is arranged independently from the pre-lithiation reactor 10 and can be provided as a place for washing the negative electrode structure 20 where pre-lithiation has been performed. To this end, a transfer roll, which transfers the negative electrode structure 20 from the pre-lithiation reactor 10 to the washing tank 70, may be arranged between the pre-lithiation reactor 10 and the washing tank 70. As such, the negative electrode structure 20 is moved in the organic solvent 71 in the washing tank 70, and impurities remaining in the negative electrode structure 20 may be removed. The organic solvent 71 does not contain lithium salt, and the same one as the organic solvent used for the above-described pre-lithiation solution may be used. Specifically, at least one selected from the group consisting of dimethyl carbonate (DMC), ethylmethyl carbonate (EMC), and ethylene carbonate (EC) may be used as the organic solvent.

The length of the washing tank 70 or the moving distance of the negative electrode structure 20 in the washing tank 70 may correspond to 0.1 to 5 times, and preferably 0.5 to 2 times of the length of the pre-lithiation section 10b, and in this range, the remaining impurities of the negative electrode structure may be smoothly removed.

Further, referring to FIG. 1, the apparatus for pre-lithiating a negative electrode according to the present invention further includes a drying unit 80 for drying a negative electrode structure 20 having passed through the washing tank 70, and a collection roll 90 for winding and unwinding the negative electrode structure 20 transferred to the drying unit 80.

The drying unit 80 may be provided as a place where the negative electrode structure 20, which has passed through the pre-lithiation reactor 10 and the washing tank 70, is dried. A transfer roll, which transfers the negative electrode structure 20 from the washing tank 70 to the drying unit 80, may be arranged between the pre-lithiation reactor 10 and the washing tank 70. In addition, the drying unit 80 may include air or inert gas. The inert gas may be at least one selected from the group consisting of Ar, N$_2$ and He.

The temperature of the drying unit 80 may be in the range of 10 to 80° C., specifically in the range of 20 to 60° C., and more specifically in the range of 25 to 40° C. This temperature range is preferable in that the oxidation of the negative electrode structure can be prevented, and the pre-lithiated state can be maintained in the range.

The length of the drying unit 80 or the moving distance of the negative electrode structure in the drying unit 80 may correspond to 0.1 to 5 times and preferably 0.5 to 2 times of the length of the pre-lithiation section. In this range, the organic solvent remaining in the negative electrode structure can be smoothly removed, and it is possible to prevent a damage to the negative electrode structure, which may occur as the organic solvent remains in the negative electrode structure for a long time.

The collection roll 90 may wind and unwind the negative electrode structure transferred to the drying unit 80. The collection roll 90 may perform the function of collecting or retrieving the negative electrode structure which has been pre-lithiated, washed and dried. The collection roll 90 may be the same as the above-described negative electrode roll.

<Method of Pre-Lithiating Negative Electrode>

The present invention provides a method of pre-lithiating a negative electrode using the above-described apparatus for pre-lithiating a negative electrode.

Figure 5:
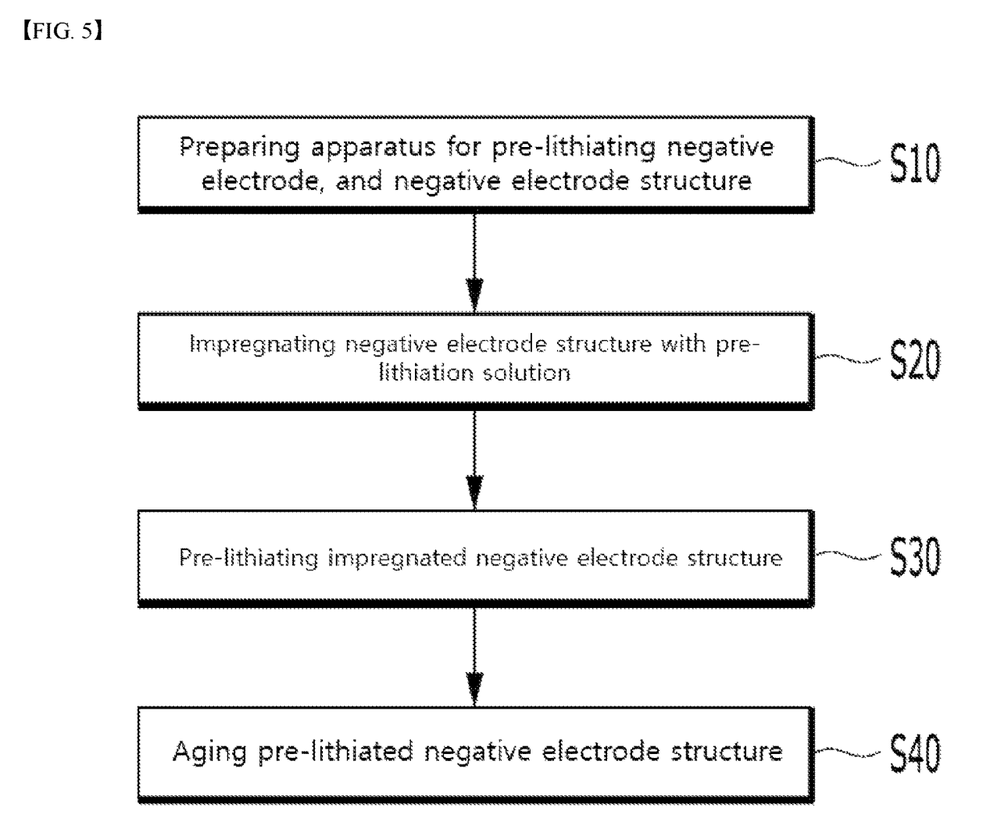
FIG. 5 is a flowchart illustrating the sequence of a method of pre-lithiating a negative electrode according to the present invention.

FIG. 5 is a flowchart illustrating the sequence of a method of pre-lithiating a negative electrode according to the present invention.

Referring to FIG. 5, a method for pre-lithiating a negative electrode according to the present invention includes: preparing a negative electrode and the above-described apparatus for pre-lithiating a negative electrode (S10); impregnating the negative electrode structure with a pre-lithiation solution while moving the negative electrode structure in the impregnation section in the pre-lithiation reactor (S20); pre-lithiating the impregnated negative electrode structure while moving the negative electrode structure in the pre-lithiation solution of the pre-lithiation section (S30); and aging the pre-lithiated negative electrode structure in the aging section (S40). At this time, the pre-lithiating is performed by arranging a lithium metal counter electrode, which is disposed to be spaced apart from the negative electrode structure, in a pre-lithiation section, and electrochemically charging the negative electrode structure, and the lithium metal counter electrode is tilted such that a separation distance with the negative electrode structure gradually increases in a moving direction of the negative electrode structure.

According to the present invention, as the lithium metal counter electrode is tilted such that a separation distance with the negative electrode structure gradually increases in a moving direction of the negative electrode structure in the process of electrochemically charging a negative electrode, it is possible to uniformly pre-lithiate the negative electrode structure by fine current in the vicinity of the end in the moving direction of the lithium metal counter electrode, thereby improving initial efficiency and cycle characteristics of a battery.

Referring to FIG. 5 together with FIGS. 1 to 4, a negative electrode structure 20 is inserted into the pre-lithiating apparatus 1 as described above. The negative electrode structure 20 has a structure where a negative electrode active material layer 22 is formed on at least one surface of the negative electrode current collector 21, and a non-coated part 23 is formed on at least one side of the negative electrode active material layer 22, and is formed by applying a negative electrode slurry including a negative electrode active material to the negative electrode current collector. The negative electrode structure is wound on the negative electrode roll.

Thereafter, the negative electrode structure 20 is unwound from the negative electrode roll 40 and is inserted into the pre-lithiation reactor 10. First of all, the negative electrode structure 20 is inserted into the impregnation section 10a in the pre-lithiation reactor 10 and is impregnated with the pre-lithiation solution 30 while moved.

At this time, the impregnation time may be appropriately set according to the pre-lithiation condition. For example, it may be 5 to 120 minutes, specifically 10 to 90 minutes, and more specifically 15 to 40 minutes. Through this, as the negative electrode structure becomes sufficiently set in the pre-lithiation solution, the pre-lithiation may be uniformly performed in the negative electrode structure. When the impregnation time exceeds the above range, the durability of the negative electrode structure decreases and the active material may be easily detached from the current collector. When the impregnation time is not within the range, it is difficult for the pre-lithiation solution to be sufficiently permeated into the negative electrode structure and it may become difficult for the pre-lithiation to be uniformly performed.

Thereafter, the negative electrode structure 20 is pre-lithiated while moving in the pre-lithiation section 10b where the lithium metal counter electrode 50 is arranged. The pre-lithiating is performed by arranging a lithium metal counter electrode 50, which is disposed to be spaced apart from the negative electrode structure 20, in a pre-lithiation section 10*b*, and electrochemically charging the negative electrode structure 20 through a charge and discharge unit 60.

At this time, the lithium metal counter electrode 50 can prevent a short circuit phenomenon which may occur by a direct contact between the negative electrode structure 20 and the lithium metal counter electrode 50 during electrochemical charge by being spaced apart from the negative electrode structure 20.

Further, the lithium metal counter electrode 50 is tilted such that a separation distance with the negative electrode structure 20 gradually increases in a moving direction of the negative electrode structure 20. Likewise, uniform pre-lithiation of the negative electrode structure 20 is possible by fine current by allowing the lithium metal counter electrode 50 to be tilted in a specific direction. The details about this are as described above.

At this time, the separation distance ($d_2$) between the lithium metal counter electrode 50 and the negative electrode structure 20 at the ending point of the pre-lithiation section 10*b* may correspond to 1.2 to 5 times, specifically 1.2 to 3 times and more specifically 2 to 3 times of the separation distance ($d_1$) between the lithium metal counter electrode 50 and the negative electrode structure 20 at the starting point of the pre-lithiation section 10*b*. When the difference between the separation distance between the lithium metal counter electrode 50 and the negative electrode structure 20 at the starting point of the pre-lithiation section 10*b* and the separation distance between the lithium metal counter electrode 50 and the negative electrode 20 at the ending point of the pre-lithiation section 10*b* is within the above range, a stable SEI film may be formed as fine current is sufficiently formed in the negative electrode structure 20.

Further, the separation distance ($d_1$) between the lithium metal counter electrode 50 and the negative electrode structure 20 at the starting point of the pre-lithiation section 10*b* may be in a range of 1 to 20 mm. Specifically, the separation distance ($d_1$) between the lithium metal counter electrode 50 and the negative electrode structure 20 at the starting point of the pre-lithiation section 10*b* may be in the range of 3 to 15 mm, and more specifically in the range of 6 to 12 mm. When the separation distance ($d_1$) between the lithium metal counter electrode 50 and the negative electrode 20 is in the above range, it is possible to sufficiently prevent an electrode short circuit phenomenon which may occur by a direct contact between the negative electrode structure 20 and the lithium metal counter electrode 50, and lithium can be smoothly inserted into the negative electrode structure 20 at the time of pre-lithiation.

Further, the lithium metal counter electrode 50 is arranged to face only the negative electrode active material layer 22. Namely, the lithium metal counter electrode 50 is arranged not to face the non-coated part 23 formed on two sides of the negative electrode active material layer 22. This is to prevent lithium metal from being precipitated on the non-coated part 23 as the lithium metal counter electrode 50 faces the non-coated part 23.

Further, the electrochemical charging process for pre-lithiation can be performed in the current density of 0.2 to 10 mA/cm$^2$, and preferably 2 to 6 mA/cm$^2$. When the electrochemical charging is performed in the current density of the above range, stable and uniform pre-lithiation can be performed on the negative electrode active material.

After the negative electrode structure 20 is pre-lithiated in the pre-lithiation section 10*b*, the negative electrode structure 20 is aged while passing through the aging section 10*c*. Herein, the aging is a step of leaving the pre-lithiated negative electrode structure 20 unattended in the pre-lithiation solution 30 for a predetermined time.

In this process, lithium ions inserted by pre-lithiation can be more uniformly diffused to the inside and the surface of the negative electrode active material. If the aging step is not performed after the pre-lithiation, the lithium ions may not be uniformly diffused in the negative electrode active material, thereby making it difficult to sufficiently remove the irreversible capacity, and there is a possibility that the uniform charge/discharge may not occur after preparation of the negative electrode.

Time, for which the negative electrode structure 20 is moved in the aging section 10*c*, may correspond to 0.5 to 21 times, and preferably 1.8 to 10 times of the time for which the negative electrode structure 20 is moved in the pre-lithiation section 10*b*. In this range, diffusion of lithium ions into the negative electrode active material can be uniformly performed, and it is possible to prevent a phenomenon that the negative electrode active material layer is detached from the current collector due to the excessive aging or resistance increases due to the increase in the thickness of the film on the surface of the negative electrode.

Further, the method for pre-lithiating a negative electrode according to the present invention further includes taking the aged negative electrode structure 20 out of the pre-lithiation reactor 10 and washing the negative electrode structure 20. Specifically, the negative electrode structure 20 is moved in the organic solvent 71 in the washing tank 70, and impurities remaining in the negative electrode structure 20 may be removed. The organic solvent 71 does not contain lithium salt, and the same one as the organic solvent used for the above-described pre-lithiation solution may be used.

Time, for which the aged negative electrode structure 20 is moved in the washing tank 71, may correspond to 0.1 to 5 times, and preferably 0.5 to 2 times of the time for which the negative electrode structure 20 is moved in the pre-lithiation section 10*b*. In this range, remaining impurities of the negative electrode structure 20 can be smoothly removed.

The method for pre-lithiating a negative electrode according to the present invention further includes drying the washed negative electrode structure.

The organic solvent remaining in the negative electrode structure by the impregnation, pre-lithiation, aging and/or washing processes may be removed by the drying step.

Specifically, the drying process can be performed by taking the washed negative electrode structure 20 out of the washing tank 70, inserting the negative electrode structure 20 into a separately prepared drying unit 80, and making the negative electrode structure 20 to be moved in the drying unit 80.

The drying step may be performed by air or inert gas. Specifically, the inert gas may be at least one selected from the group consisting of Ar, N$_2$ and He.

The drying step may be performed in the range of 10 to 80° C., specifically in the range of 20 to 60° C., and more specifically in the range of 25 to 40° C. This temperature range is preferable in that the oxidation of the negative electrode structure can be prevented, and the pre-lithiated state can be maintained in the range.

Time, for which the washed negative electrode structure 20 is dried, may correspond to 0.1 to 5 times and preferably 0.5 to 2 times of the time for which the negative electrode structure is moved in the pre-lithiation section 10b. In this range, it is possible to smoothly remove the organic solvent remaining in the negative electrode structure, and it is possible to prevent a damage to the negative electrode structure, which may occur as the organic solvent remains in the negative electrode structure for a long time.

The collection roll 90 may be installed in the drying unit 80, and the negative electrode structure 20 having moved in the drying unit 80 may be wound by the collection roll 90. The negative electrode structure 20 wound by the collection roll 90 may be cut into an appropriate size to thereby be finally manufactured as a negative electrode.

<Secondary Battery>

Further, the present invention provides a method for manufacturing a secondary battery including the above-described method of pre-lithiating a negative electrode.

The secondary battery has a form where an electrode assembly, which has a form that a separator is interposed between a positive electrode and a negative electrode, is accommodated in a battery case. The positive electrode has a structure that a positive electrode active material layer is formed as a positive electrode slurry containing a positive electrode active material is applied on a positive electrode current collector, and the negative electrode is as described above.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or CO; olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Further, the positive electrode slurry further contains a conductive material and a binder as well as a positive electrode active material, which is as described above.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

Further, the battery case is not particularly limited as long as it is used as an exterior material for packaging the battery, and a cylindrical, square, or pouch type may be used and specifically a pouch-type battery case may be used. The pouch-type battery case is generally made of an aluminum laminate sheet and may be composed of an inner sealant layer for sealing, a metal layer for preventing permeation of materials, and an external resin layer forming the outermost part of the case. Details of the battery case are known to those of ordinary skill in the art, and thus detailed description thereof will be omitted.

When an electrode assembly is accommodated in a battery case, the electrolyte solution is injected and sealed. Thereafter, a final secondary battery is manufactured through the formation process. Details about the electrolyte solution are known to those of ordinary skill in the art, and thus detailed description thereof will be omitted.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

<Preparation of Negative Electrode Structure>

92 wt % of negative electrode active material (graphite 90%, SiO 10%), 3 wt % of conductive material (Danka black), 3.5 wt % of binder (SBR), and 1.5 wt % of thickener (CMC) was added to water to thereby prepare a negative electrode slurry.

The negative electrode slurry was coated on both surfaces of the copper current collector (thickness: 8 μm), which was then rolled and dried at a vacuum oven of 130° C. for 12 hours, to thereby form a negative electrode active material layer on one surface of the copper negative electrode current collector (thickness: 70 μm, width: 10 cm) and form the non-coated parts (1 cm) on two sides of the negative electrode active material layer, respectively, to thereby manufacture a negative electrode structure.

The negative electrode structure was wound on a negative electrode roll which is made of stainless steel and has a diameter of 3 inches.

<Preparation of Pre-Lithiation Reactor>

A pre-lithiation reactor made of stainless steel having width 270 cm×length 20 cm×height 60 cm was prepared. The pre-lithiation solution of the amount corresponding to 30% of the height of the pre-lithiation reactor was injected into the pre-lithiation reactor. The temperature of the pre-lithiation reactor was maintained at 25° C.

The pre-lithiation solution was manufactured by adding $LiPF_6$ of 1.4M concentration as a lithium salt to an organic solvent, which is obtained by mixing ethylene carbonate (EC), fluoroethylene carbonate (FEC) and ethyl methyl carbonate (EMC) at the volume ratio of 10:20:70.

The pre-lithiation reactor was divided into an impregnation section, a pre-lithiation section, and an aging section. A plurality of rolls were installed in the impregnation section, the pre-lithiation section and the aging section for smooth movement of the negative electrode structure.

<Pre-Lithiation>

The negative electrode structure was unwound from the negative electrode roll, and was inserted into the pre-lithiation reactor at the speed of 1 cm/min. The unwound negative electrode structure entered the impregnation section and moved for 50 minutes to be impregnated with the electrolyte solution.

The negative electrode structure having passed through the impregnation section entered the pre-lithiation section, and electric current was applied at the current density of 3.04 mA/cm$^2$. At this time, the current was applied in pulse form of the period of 5 seconds.

A lithium metal counter electrode was disposed to be spaced apart from the negative electrode structure by a predetermined distance in the pre-lithiation section, and stainless steel (SUS) was joined to the lithium metal counter electrode to support the lithium metal counter electrode.

At this time, the lithium metal counter electrode is tilted such that a separation distance with the negative electrode structure gradually increases in a moving direction of the negative electrode structure. Specifically, the separation distance between the lithium metal counter electrode and the negative electrode structure at the starting point of the pre-lithiation section was set to 6 mm, and the separation distance between the lithium metal counter electrode and the negative electrode structure at the ending point of the pre-lithiation section was set to 7.2 mm. Namely, a separation distance between the lithium metal counter electrode and the negative electrode structure at an ending point of the pre-lithiation section was set to correspond to 1.2 times of a separation distance between the lithium metal counter electrode and the negative electrode structure at a starting point of the pre-lithiation section.

The negative electrode structure having passed through the pre-lithiation section then entered the aging section and was aged while moving in the aging section for 30 minutes.

<Washing and Drying>

A washing tank made of stainless steel having width 50 cm×length 20 cm×height 60 cm was prepared. A roll for transferring a negative electrode structure was installed between the pre-lithiation reactor and the washing tank. Dimethyl carbonate of the amount corresponding to 30% of the height of the washing tank was contained in the washing tank.

The aged negative electrode structure was taken out of the pre-lithiation reactor and was inserted into the washing tank, and moved in the washing tank for 50 minutes.

Thereafter, a drying unit made of stainless steel having width 20 cm×length 20 cm×height 60 cm was prepared. The temperature of the drying unit was 25° C., and inert gas was filled therein. A roll for transferring the negative electrode structure was installed between the washing tank and the drying unit. A collection roll was installed in the drying unit.

The washed negative electrode structure moved in the drying unit through the roll for 20 minutes. The negative electrode structure having moved in the drying unit was wound by the collection roll.

Example 2

The negative electrode structure was manufactured in the same manner as in the example 1 except that in the pre-lithiation section, the lithium metal counter electrode is tilted such that a separation distance with the negative electrode structure gradually increases in a moving direction of the negative electrode structure, and the separation distance between the lithium metal counter electrode and the negative electrode structure at the starting point of the pre-lithiation section was set to 6 mm, and the separation distance between the lithium metal counter electrode and the negative electrode structure at the ending point of the pre-lithiation section was set to 12 mm.

Example 3

The negative electrode structure was manufactured in the same manner as in the example 1 except that in the pre-lithiation section, the lithium metal counter electrode is tilted such that a separation distance with the negative electrode structure gradually increases in a moving direction of the negative electrode structure, and the separation distance between the lithium metal counter electrode and the negative electrode structure at the starting point of the pre-lithiation section was set to 6 mm, and the separation distance between the lithium metal counter electrode and the negative electrode structure at the ending point of the pre-lithiation section was set to 18 mm.

Comparative Example 1

Figure 6:
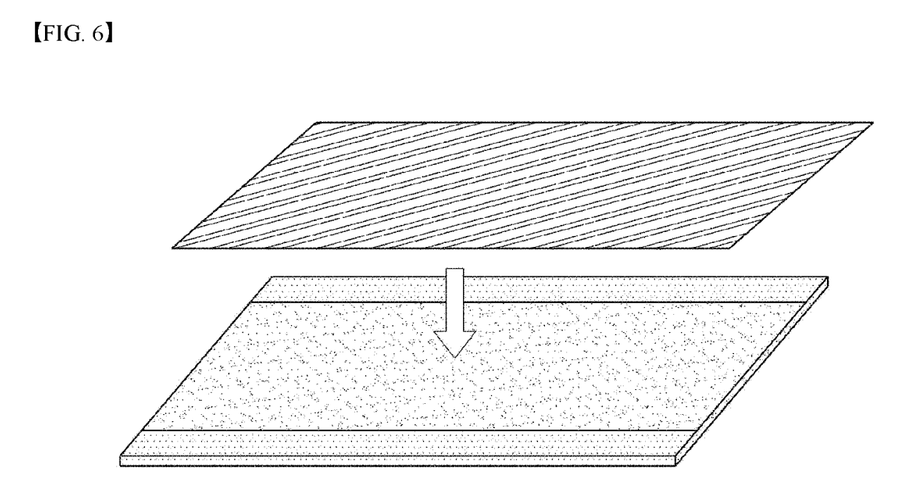
FIG. 6 is a schematic diagram showing an array relationship between a negative electrode structure and a lithium metal counter electrode according to comparative example 1.

As shown in FIG. 6, the lithium metal counter electrode was arranged to be parallel to the negative electrode structure in the pre-lithiation section. At this time, the distance between the lithium metal counter electrode and the negative electrode structure was maintained as 6 mm. The negative electrode structure was manufactured as in the example 1 except the above point.

Comparative Example 2

Figure 7:
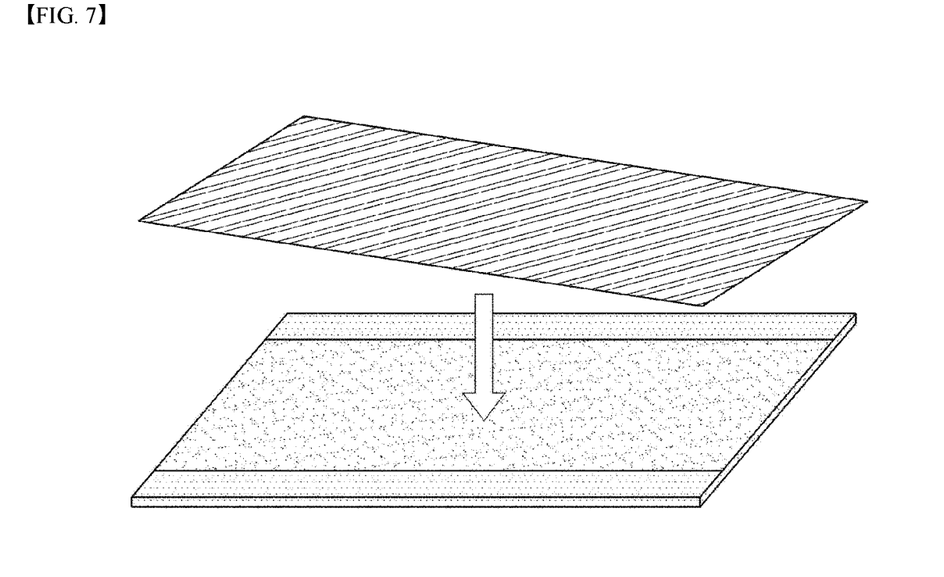
FIG. 7 is a schematic diagram showing an array relationship between a negative electrode structure and a lithium metal counter electrode according to comparative example 2.
Figure 8:
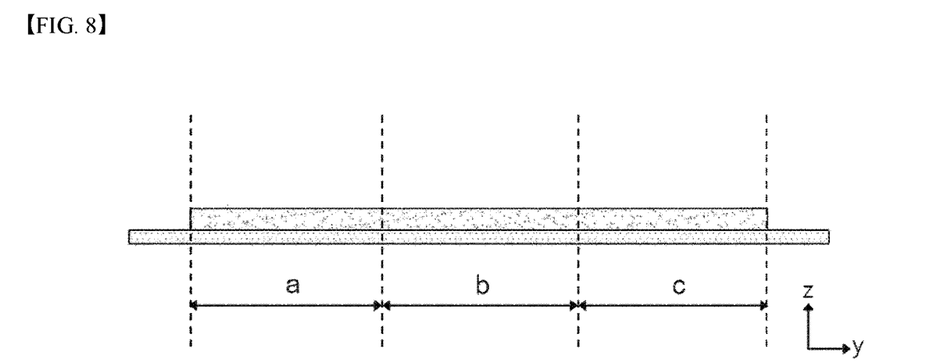
FIG. 8 is a schematic diagram illustrating a state in which a negative electrode structure has been divided to measure initial efficiency for each section, based on the width direction of the negative electrode structure.

The negative electrode structure was manufactured in the same manner as in the example 1 except that in the pre-lithiation section, the lithium metal counter electrode is tilted such that a separation distance with the negative electrode structure gradually decreases in a moving direction of the negative electrode structure as shown in FIG. 7, and the separation distance between the lithium metal counter electrode and the negative electrode structure at the starting point of the pre-lithiation section was set to 6 mm, and the separation distance between the lithium metal counter electrode and the negative electrode structure at the ending point of the pre-lithiation section was set to 3 mm.

Experimental Example

<Preparation of Lithium Secondary Battery>

The negative electrode structure, which was manufactured in the examples and comparative examples, divided into 3 parts in the width direction to set sections (sections a to c), and the negative electrode was cut in the coin cell size in each section. Namely, the section b is a central portion in the width direction of the negative electrode structure, and the sections a and c are two edge portions adjacent to the non-coated part on the basis of the width direction in the negative electrode structure.

Thereafter, a negative electrode, and a lithium metal foil, which was a counter electrode to the negative electrode, were prepared, and a polyolefin separator were interposed therebetween. Thereafter, a coin-type half-cell was manufactured by injecting an electrolyte solution which is obtained by dissolving 1M LiPF$_6$ in a solvent obtained by mixing ethylene carbonate (EC) and diethyl carbonate (DEC) at the volume ratio of 50:50.

<Initial Reversibility Test>

A reversibility test for the coin-type half-cell manufactured as described above was performed using an electrochemical charge-discharge device. During charging, the battery was charged at a current density of 0.1 C-rate up to a voltage of 0.005 V (vs. Li/Li+), and discharged to a voltage of 1.5 V at the same current density during discharging. At this time, the initial reversibility was measured using the ratio of the charge capacity to the discharge capacity as in the Formula 1, and the result was shown in Table 1.

Initial efficiency (%)={(initial discharge capacity)/(initial charge capacity)}×100     [Formula 1]

TABLE 1

| Initial efficiency (%) | Example 1 | Example 2 | Example 3 | Comparative Example 1 | Comparative Example 2 |
|---|---|---|---|---|---|
| Section a | 99.4 | 99.0 | 98.3 | 94.3 | 89.5 |
| Section b | 99.2 | 99.1 | 98.8 | 97.1 | 98.0 |
| Section c | 99.3 | 98.9 | 98.6 | 93.9 | 90.3 |

Referring to Table 1, it is seen that the initial efficiencies of the negative electrode according to the examples was higher than those in the comparative examples. This is because a lot of lithium ions entered into the negative electrode structure during the initial part of the pre-lithiation section, and then a stable SEI film was formed during the latter part of the pre-lithiation section. On the other hand, in the case of the comparative example 1, the initial efficiency was lower than that of the examples because fine current was not applied. In the case of the comparative example 2, an SEI film was formed in a state that the charge of lithium was not sufficient as fine current was applied during the initial part of the pre-lithiation, and as such, lithium failed to flow into the deep side of the negative electrode structure and side reaction occurred on the surface, which lowered the initial efficiency.

Further, referring to Table 1, in the case of the negative electrode according to the example, there was no significant difference in the initial efficiency between sections because pre-lithiation was uniformly performed due to fine current. In the case of comparative examples 1 and 2, as the negative electrode structure is shaken in the width direction while moving in the pre-lithiation section, time, for which two sides (section a and section c) of the negative electrode structure face the lithium metal counter electrode, decreased, thereby decreasing the amount of pre-lithiation. Further, in this situation, as fine current was not formed, pre-lithiation was not uniformly performed, thereby making a difference in initial efficiency by sections.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

The invention claimed is:

1. An apparatus for pre-lithiating a negative electrode, the apparatus comprising:
   a pre-lithiation reactor sequentially divided into an impregnation section, a pre-lithiation section and an aging section, wherein the pre-lithiation reactor accommodates a pre-lithiation solution in which a negative electrode structure is moved through the pre-lithiation reactor;
   a negative electrode roll arranged outside the pre-lithiation solution and on which the negative electrode structure before being moved through the pre-lithiation reactor is wound;
   a lithium metal counter electrode present in the pre-lithiation solution in the pre-lithiation section, wherein the lithium metal counter electrode is spaced apart from the negative electrode structure by a predetermined distance to face the negative electrode structure moved in the pre-lithiation solution; and
   a charge and discharge unit connected to the negative electrode structure and connected to the lithium metal counter electrode,
   wherein the lithium metal counter electrode is tilted and a separation distance from the negative electrode structure gradually increases in a moving direction of the negative electrode structure.

2. The apparatus of claim 1, wherein the lithium metal counter electrode is arranged only in the pre-lithiation section.

3. The apparatus of claim 2, wherein the separation distance between the lithium metal counter electrode and the negative electrode structure at an ending point of the pre-lithiation section corresponds to 1.2 to 5 times of the separation distance between the lithium metal counter electrode and the negative electrode structure at a starting point of the pre-lithiation section.

4. The apparatus of claim 3, wherein the separation distance between the lithium metal counter electrode and the negative electrode structure at the starting point of the pre-lithiation section is in a range of 1 mm to 20 mm.

5. The apparatus of claim 1, wherein the negative electrode structure comprises a negative electrode current collector and a negative electrode active material layer on at least one surface of the negative electrode current collector, and a non-coated part on at least one side of the negative electrode current collector in a width direction of the negative electrode active material layer.

6. The apparatus of claim 5, wherein the lithium metal counter electrode faces only the negative electrode active material layer.

7. The apparatus of claim 1, further comprising a washing tank containing an organic solvent.

8. The apparatus of claim 7, further comprising:
   a dryer connected to the washing tank, wherein the dryer dries the negative electrode structure having passed through the washing tank, and
   a collection roll for winding and unwinding the negative electrode structure transferred to the drying unit.

9. A method for pre-lithiating a negative electrode, the method comprising:
preparing a negative electrode structure and the apparatus for pre-lithiating the negative electrode according to claim 1;
impregnating the negative electrode structure with the pre-lithiation solution while moving the negative electrode structure through the impregnation section in the pre-lithiation reactor to form an impregnated negative electrode structure;
pre-lithiating the impregnated negative electrode structure while moving the negative electrode structure through the pre-lithiation solution of the pre-lithiation section to form a pre-lithiated negative electrode structure; and
aging the pre-lithiated negative electrode structure in the aging section,
wherein the pre-lithiating is performed by arranging the lithium metal counter electrode spaced apart from the negative electrode structure, in the pre-lithiation section, and electrochemically charging the negative electrode structure, and
wherein the lithium metal counter electrode is tilted and the separation distance from the negative electrode structure gradually increases in the moving direction of the negative electrode structure.

10. The method of claim 9, wherein the separation distance between the lithium metal counter electrode and the negative electrode structure at an ending point of the pre-lithiation section corresponds to 1.2 to 5 times of the separation distance between the lithium metal counter electrode and the negative electrode structure at a starting point of the pre-lithiation section.

11. The method of claim 9, wherein the separation distance between the lithium metal counter electrode and the negative electrode structure at a starting point of the pre-lithiation section is in a range of 1 mm to 20 mm.

12. The method of claim 9, wherein the negative electrode structure comprises a negative electrode current collector and a negative electrode active material layer on at least one surface of the negative electrode current collector, and a non-coated part is on at least one side of the negative electrode current collector in a width direction of the negative electrode active material layer.

13. The method of claim 12, wherein the aged lithium metal counter electrode only faces the negative electrode active material layer.

14. The method of claim 9, further comprising removing the negative electrode structure from the pre-lithiation reactor and washing the negative electrode structure.

15. The method of claim 14, further comprising drying the washed negative electrode structure.

16. A method for manufacturing a secondary battery including the method of pre-lithiating a negative electrode according to claim 9.

* * * * *